United States Patent
Bailey et al.

(10) Patent No.: US 9,262,554 B1
(45) Date of Patent: Feb. 16, 2016

(54) MANAGEMENT OF LINKED LISTS WITHIN A DYNAMIC QUEUE SYSTEM

(75) Inventors: Patrick Bailey, Port Coquitlam (CA); Heng Liao, Belcarra (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 269 days.

(21) Appl. No.: 13/027,777

(22) Filed: Feb. 15, 2011

Related U.S. Application Data

(60) Provisional application No. 61/305,057, filed on Feb. 16, 2010.

(51) Int. Cl.
*G06F 17/30* (2006.01)
*G06F 3/0482* (2013.01)

(52) U.S. Cl.
CPC .... *G06F 17/30985* (2013.01); *G06F 17/30569* (2013.01); *G06F 3/0482* (2013.01)

(58) Field of Classification Search
CPC .................. G06F 17/30958; G06F 17/30569
USPC .................................................. 707/797–812
See application file for complete search history.

(56) References Cited

U.S. PATENT DOCUMENTS

| | | | |
|---|---|---|---|
| 5,517,462 A * | 5/1996 | Iwamoto et al. | 365/195 |
| 5,809,557 A | 9/1998 | Shemla et al. | |
| 6,049,802 A | 4/2000 | Waggener, Jr. et al. | |
| 6,219,728 B1 | 4/2001 | Yin | |
| 6,430,666 B1 | 8/2002 | Roth | |
| 6,640,267 B1 | 10/2003 | Raza | |
| 6,694,388 B1 | 2/2004 | Schzukin et al. | |
| 7,035,988 B1 * | 4/2006 | Marino | 711/170 |
| 7,111,289 B2 * | 9/2006 | Koob et al. | 717/152 |
| 7,334,091 B1 | 2/2008 | Mizrahi | |
| 7,337,275 B2 * | 2/2008 | Wolrich et al. | 711/132 |
| 2005/0235129 A1 | 10/2005 | Sokol | |
| 2007/0294499 A1 * | 12/2007 | Garthwaite | 711/170 |

\* cited by examiner

*Primary Examiner* — Hosain Alam
*Assistant Examiner* — Tuan-Khanh Phan
(74) *Attorney, Agent, or Firm* — Dennis R. Haszko

(57) ABSTRACT

A method and apparatus are disclosed for management of linked lists within a dynamic queue system. In a dynamic queue system where a central memory is shared amongst a set of queues, the method organizes the linked list structures of the queues. The linked list pointers of the queues are organized over a set of single port memories. Memory for the queue entries is allocated in an alternating fashion, which allows the method to provide per-cycle access to queues while reducing the footprint of the memory elements used for maintaining the linked list structures. The method disclosed reduces the overall memory requirements for the design and implementation of queue systems with multiple queues sharing a common pool of memory.

24 Claims, 17 Drawing Sheets

MANAGEMENT OF LINKED LISTS WITHIN A DYNAMIC QUEUE SYSTEM

CROSS-REFERENCE TO RELATED APPLICATION

This application claims the benefit of priority of U.S. Provisional Patent Application No. 61/305,057 filed Feb. 16, 2010, which is incorporated herein by reference.

FIELD

The present disclosure relates generally to data queuing systems. More particularly, the present disclosure relates to a queuing system that uses linked lists to form queues and manage memory.

BACKGROUND

Typical queuing systems contain multiple queues, which a user can access by pushing data onto a queue or popping data from a queue. The more complex queuing systems typically have a common pool of memory shared amongst all or a group of queues. The common pool of memory is used for storing queue entries as they are pushed onto individual queues. One flexible approach is for the common pool of memory to be managed dynamically.

In a dynamic queue system, the common memory locations that are available for use by queues are tracked and managed. This tracking mechanism is sometimes referred to as the free list or free queue. Dynamic queue systems usually support two queue operations: push and pop. A push operation will add an entry to a queue, while a pop operation will remove an entry. A push operation will cause memory to be de-allocated from the empty list and allocated to the particular queue. The data which is being pushed onto the queue is then stored at the newly allocated memory location. A pop operation returns the data from the queue, and the common memory pool in which the data is stored is then de-allocated from the queue and re-allocated to the free list.

With dynamically allocated memory, individual queues are formed by a linked list. For every queue entry, there is a pointer to the next entry in the queue. Each queue typically has a read and write pointer for the start and end of the linked list. The locations in the common pool which are not allocated to a particular queue are maintained as part of a separate linked list, with its own write and read pointer, or a simple head of stack pointer. Either way this is usually called the free list. Another method is to use a separate dedicated first in first out (FIFO) memory where the addresses of the un-allocated common memory are stored within an array.

FIG. 1 depicts a classic singly linked list queue structure, indicating a typical relationship between queue data 10, queue entries 12 and pointers 14. As shown in FIG. 1, the reference numeral 14 is used generically refer to a number of different types of pointers, such as: a read pointer; pointer to next; and write pointer.

FIGS. 2 and 3 depict physical and logical views, respectively, of a typical dynamic queue system with a linked list memory 16, a common memory pool 18 and the queue pointers: read 20, read next 22, and write 24, with queue pointers of each type being provided for each queue. The linked list memory 16 and common memory pool 18 are typically implemented as a single port random access memory (RAM), while the queue pointers 20, 22 and 24 are either register-based or stored in a RAM. In this example, the linked list memory 16 and common memory 18 each have eight memory locations addressed: A0, A1 to A7. Because every entry in the common memory pool 18 must have a pointer to the next entry, the linked list memory 16 and common memory 18 are required to have equal number of locations.

When allocated to a particular queue, a common memory pool location contains a queue entry. FIGS. 2 and 3 illustrate two queues: Queue 1 26 and Queue 2 28. When un-allocated, a common memory pool memory location is part of the free list 32, shown in FIG. 3. In this example, the start address of the free list is held in a stack pointer register 30 shown in FIG. 2. The physical view of FIG. 2 shows the memory contents, and the logical view of FIG. 3 displays the links from one entry to the next with respect to Queue 1 26, Queue 2 28 and Free List 32.

FIGS. 4 and 5 show physical and logical views, respectively, of a push operation performed on the typical dynamic queue system of FIG. 2. In such a system, the following memory operations are needed for a queue push operation:

Step 34: A read of the queue read/write pointer memory 20, 22, 24 is needed to retrieve the read and write queue pointers of the queue being operated on. This step is sometimes not needed as the queue pointers can be stored in registers instead of RAMs.

Step 36: Write the new queue entry 38 into the common memory 18. The free list stack pointer value 30 is used as the address to the common memory where the queue entry is to be written. This is typically a 1 cycle write operation to the common memory. As the stack pointer is stored in a register, the address for common memory is immediately available.

Step 40: Update the free list 32 by removing the newly allocated common memory. This is done by reading the linked list memory to get the next item in the free list and updating the free list stack pointer 30. This is typically a 1 cycle read operation of the linked list memory 16. The stack free list stack pointer register is then updated on the next cycle.

Step 42: Update the queue write pointer 24 with the current contents of the vacant stack pointer register 30. This effectively moves the write pointer to the latest entry in the queue. This is typically a 1 cycle write operation to the queue read/write pointer memory.

Step 44: Update the queue linked list 16 with the pointer to new entry. This takes the last entry currently in the queue and creates a link to the newly pushed data, effectively increasing the linked list by one. This is typically a 1 cycle write operation to the linked list memory at the address pointed to by the current write pointer.

FIGS. 6 and 7 show physical and logical views, respectively, of a pop operation performed on the typical dynamic queue system of FIG. 2. The following memory operations are needed for a queue pop operation:

Step 46: A read of the queue read/write pointer memory 20, 22, 24 is needed to retrieve the read and write queue pointers of the queue being operated on. This is sometimes not needed as the queue pointers can be stored in registers instead of RAMs.

Step 48: Read the queue entry from the common memory pool 18 using the queue read pointer 20 for queue 1 as the address to the common memory. This is a 1 cycle read operation of the common memory.

Step 50: Update the read pointer 20 for queue 1. The next read pointer value is written into the current read pointer register. This is a 1 cycle write operation into the read pointer register.

Step 52: Update the next read pointer 22 for queue 1. The linked list memory 16 is read to retrieve address of the entry following the next read pointer. The next read pointer value is used as the address to the linked list memory and the data returned is written into the next read pointer register 22. This is a 1 cycle write operation into the next read pointer register, and a 1 cycle read operation of the linked list memory.

Step 54: Place the newly un-allocated memory at the top of the free list stack 32. The stack pointer 30 is updated with the current read pointer value. This is a 1 cycle write operation into the free list stack pointer register.

Step 56: The linked list value of the newly un-allocated memory is updated to point to the next entry in the free list. The read pointer value is used as the address to the linked list memory and the data written is the current value of free list stack pointer.

It is important to note that dynamic queue system implementations are usually pipelined. Therefore, many of the memory transactions previously described will occur concurrently. Because the memory transactions are pipelined, a push or pop operation will always encounter latency in completing. Regardless of latency, for maximum performance of a dynamic queue system, the system must complete a push or pop operation at every clock cycle.

Each push or pop queue operation requires one transaction to the common memory pool and two transactions to the linked list memory. Typical hardware implementations will use a single port RAM or a bank of single port RAMs for the common pool memory. The selection of RAM for the linked list memory is more critical as the two memory transactions are required. The least costly storage in terms of area utilization is to use a single port RAM for the linked list memory, but the performance impacts are such that the system would be limited to one push or pop operation every two clock cycles.

Alternatively some systems utilize register based storage for the linked list. This option is feasible for systems that provide only a small amount of queue storage. For larger dynamic queue systems, a register based approach does not provide the density when compared to RAMs.

One more approach is for the linked list memory to use a dual port RAM as these can perform both a read and write within the same clock. This meets the performance goals. However, again the hardware area of the linked list storage can quickly approach the footprint of common pool memory, making such a system very costly and effectively mitigating some of the advantages of a dynamic queue system. In these situations it can take more hardware resources to maintain the linked list storage then the actual queue entries themselves.

For ASIC (Application Specific Integrated Circuit) based implementation, queuing systems are required to be flexible and high performance while minimizing hardware resources. To maximize bandwidth, queues should be accessible for push and pop operations at every clock cycle.

SUMMARY

It is an object of the present disclosure to obviate or mitigate at least one disadvantage of previous dynamic queue systems and methods.

In an implementation, the present disclosure provides a method of linked list management in a dynamic queue system, including the following: dividing an uninitialized common memory pool into first and second sub-pools of equal size; tracking unallocated memory locations in the first and second sub-pools using first and second free lists, respectively, the first and second free lists stored on separate single port memories; and alternating queue entries over the first and second sub-pools such that at most one memory transaction occurs in each sub-pool free list when a queue operation is performed.

In an embodiment, when the queue operation is performed, a queue linked list update transaction occurs on a different sub-pool than a free list update transaction. The method can further include initializing the first and second free lists such that each of the memory locations within a sub-pool is part of a respective free list.

The method can further include storing, for each queue, an associated sub-pool queue index, which determines the sub-pool to be used for allocating memory when performing a queue operation. The method can also further include storing the first and second free lists on first and second single port linked list memories, respectively, and storing queue linked lists such that the queue linked lists span both the first and second single port linked list memories.

In an implementation, the present disclosure provides a dynamic queue system, comprising a common memory pool, first and second sub-pool free lists, and a queue manager. The common memory pool comprises a first sub-pool and a second sub-pool, the first and second sub-pools being of equal size. The first sub-pool free list is provided in a first single port linked list memory and arranged to track each un-allocated memory location in the first sub-pool. The second sub-pool free list is provided in a second single port linked list memory and arranged to track each un-allocated memory location in the second sub-pool. The queue manager is arranged to allocate memory for queue entries in an alternating manner between the first sub-pool and the second sub-pool such that per-cycle queue operations are achieved using the single port linked list memories for storage of linked list data.

In an embodiment, the queue manager allocates memory for queue entries such that at most one memory transaction occurs in each sub-pool free list when a queue operation is performed. In an embodiment, the queue manager allocates memory for queue entries such that a queue linked list update transaction occurs on a different sub-pool than a free list update transaction.

In an embodiment, the system further comprises a queue sub-pool index associated with each queue, which determines the sub-pool to be used for allocating memory when performing a queue operation.

The first and second single port linked list memories can comprise a single port random access memory (RAM). The first and second sub-pool free lists can be maintained as a stack, or as a FIFO based linked list.

In another implementation, the present disclosure provides a method of linked list management in a dynamic queue system, including the following: dividing an uninitialized common pool of memory into a plurality of sub-pools of equal size; tracking unallocated memory locations in the plurality of sub-pools using a plurality of free lists each uniquely matched with one of the plurality of sub-pools, each of the plurality of free lists stored on separate single port memories; and alternating queue entries over the plurality of sub-pools such that at most one memory transaction occurs in each sub-pool free list when a queue operation is performed.

In an embodiment, when the queue operation is performed, a queue linked list update transaction occurs on a different sub-pool than a free list update transaction. In an embodiment, alternating the queue entries comprises evenly distributing the queue entries over the plurality of sub-pools one at a time, starting with a first sub-pool, until the number of queue entries equals the number of sub-pools. After the number of queue entries equals the number of sub-pools, the next entry can be assigned to the first sub-pool, and the pattern repeated.

In a further implementation, the present disclosure provides a dynamic queue system including a common memory pool, a plurality of sub-pool free lists, and a queue manager.

The common memory pool comprises a plurality of sub-pools, each of the plurality of sub-pools being of equal size. Each of the plurality of sub-pool free lists is provided in a separate single port linked list memory. Each of the plurality of sub-pool free lists are uniquely associated with one of the plurality of sub-pools and arranged to track each un-allocated memory location in the uniquely associated sub-pool. The queue manager is arranged to allocate memory for queue entries in an alternating manner over the plurality of sub-pools such that per-cycle queue operations are achieved using the single port linked list memories for storage of linked list data.

In an embodiment, the queue manager allocates memory for queue entries such that at most one memory transaction occurs in each sub-pool free list when a queue operation is performed. In an embodiment, the queue manager allocates memory for queue entries such that a queue linked list update transaction occurs on a different sub-pool than a free list update transaction. The queue manager can evenly distribute the queue entries over the plurality of sub-pools one at a time, starting with a first sub-pool, until the number of queue entries equals the number of sub-pools.

In a further implementation, the present disclosure provides an integrated circuit including a dynamic queue system as described and illustrated herein.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

Figure 1:
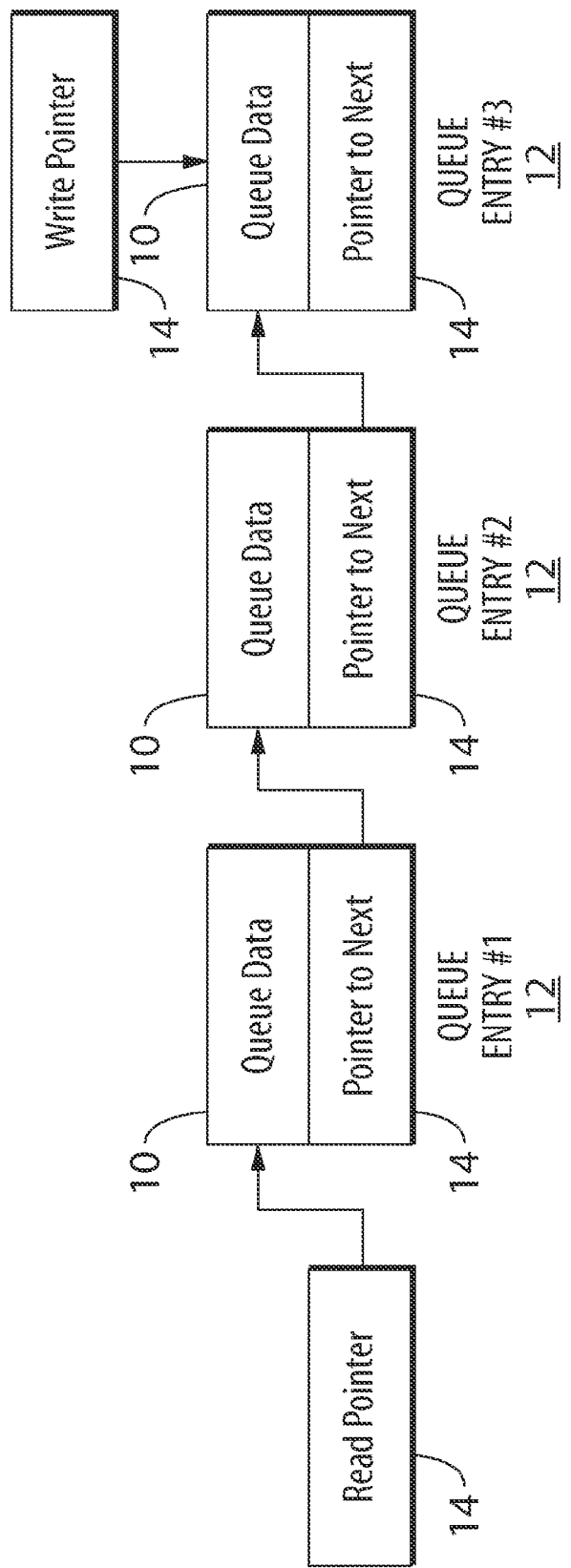
FIG. 1 illustrates a classic singly linked list queue structure.
Figure 2:
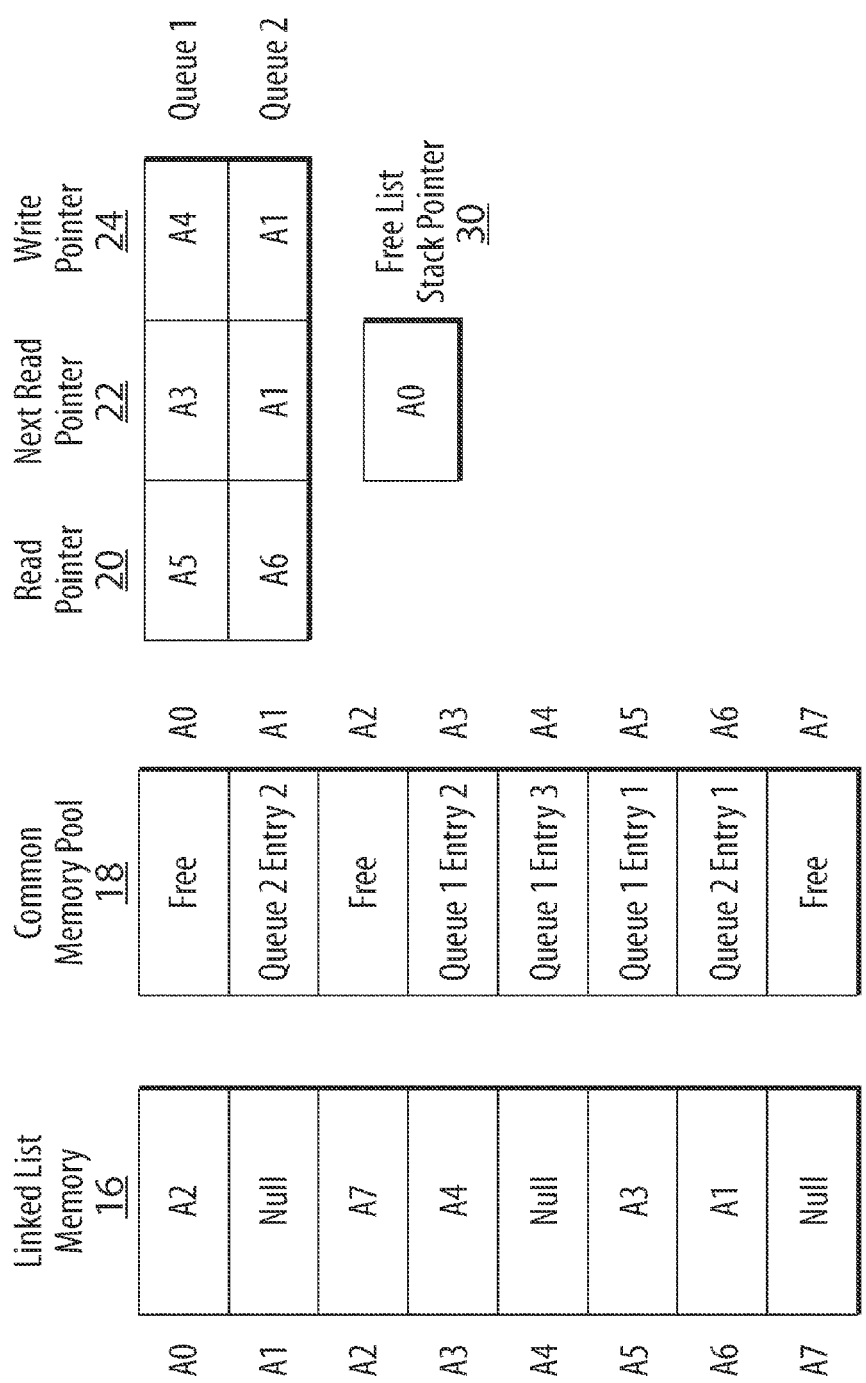
FIG. 2 illustrates a physical view of a typical dynamic queue system with a linked list memory, a common memory pool and the queue pointers: read, write and read next.
Figure 3:
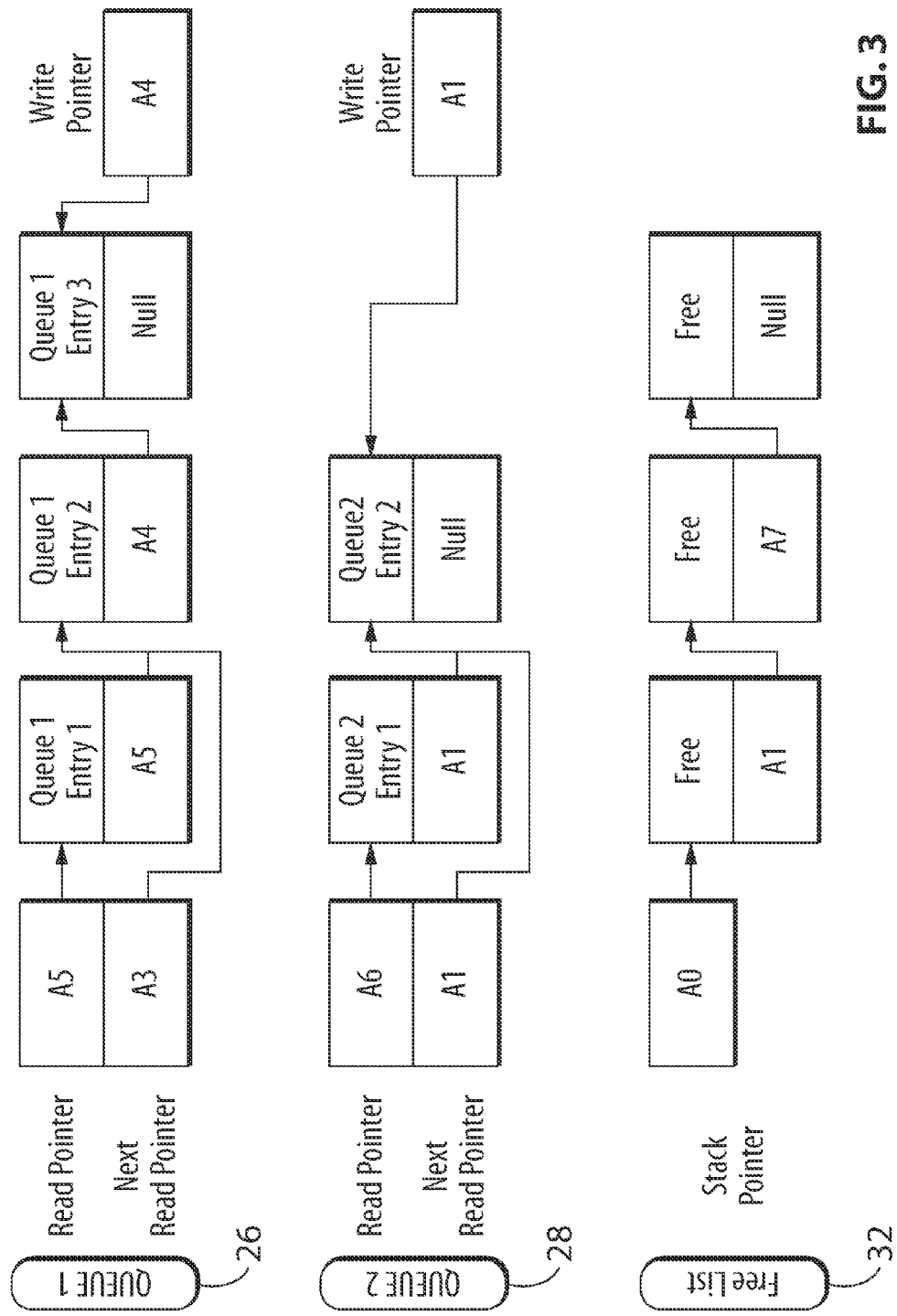
FIG. 3 illustrates a logical view of the system of FIG. 2.
Figure 4:
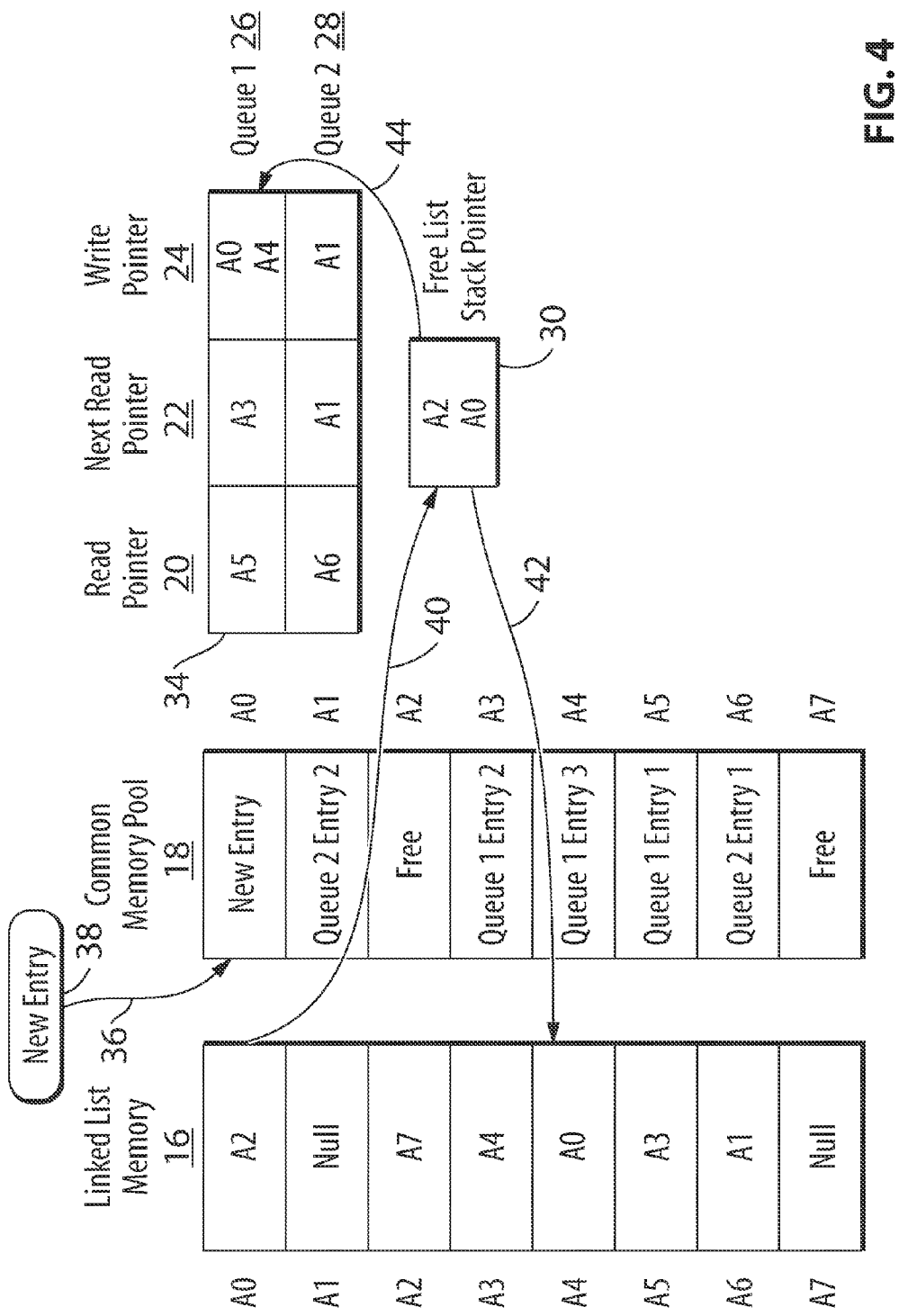
FIG. 4 illustrates a push operation performed on the system of FIG. 2.
Figure 5:
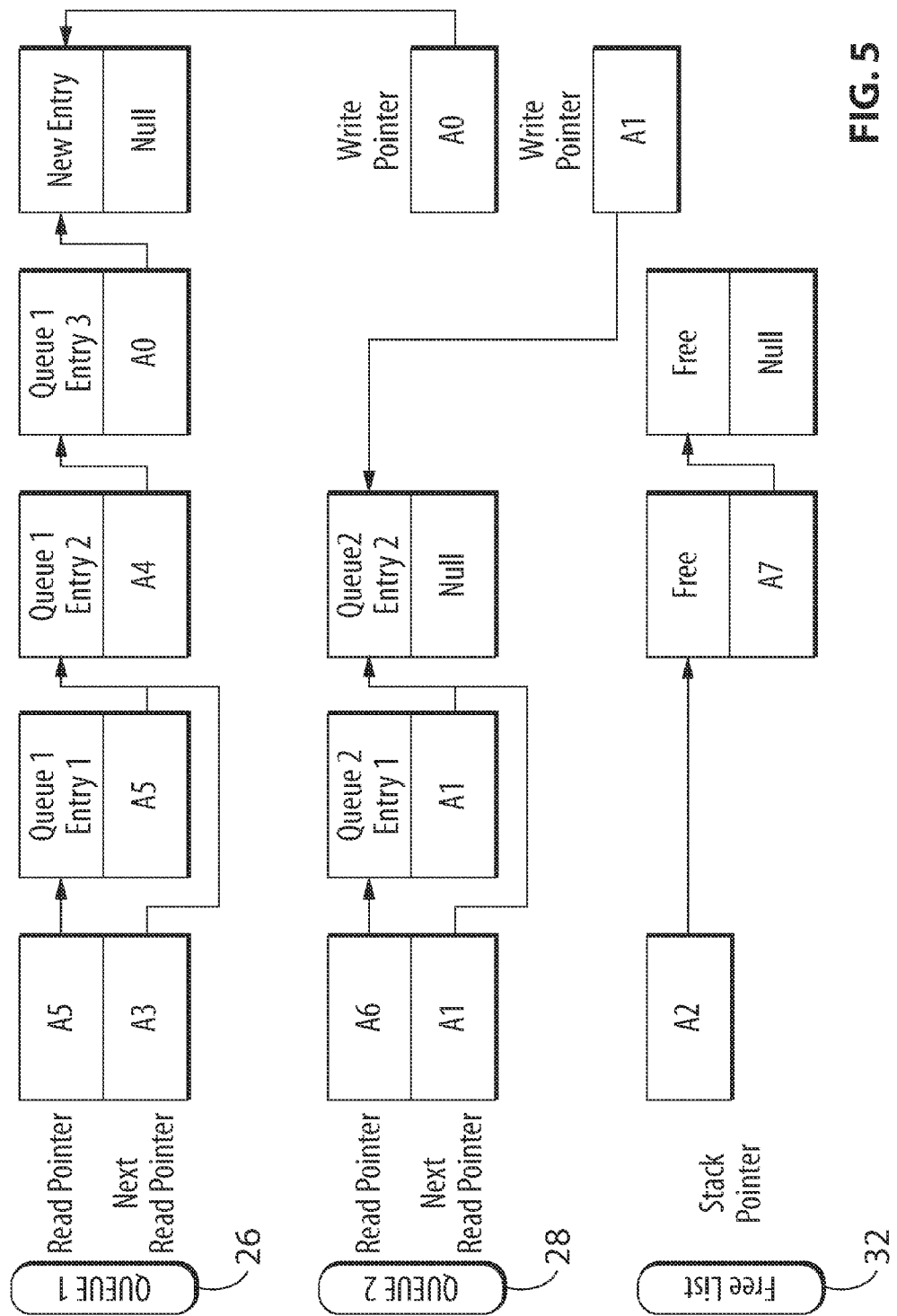
FIG. 5 illustrates a logical view of the push operation shown in FIG. 4.
Figure 6:
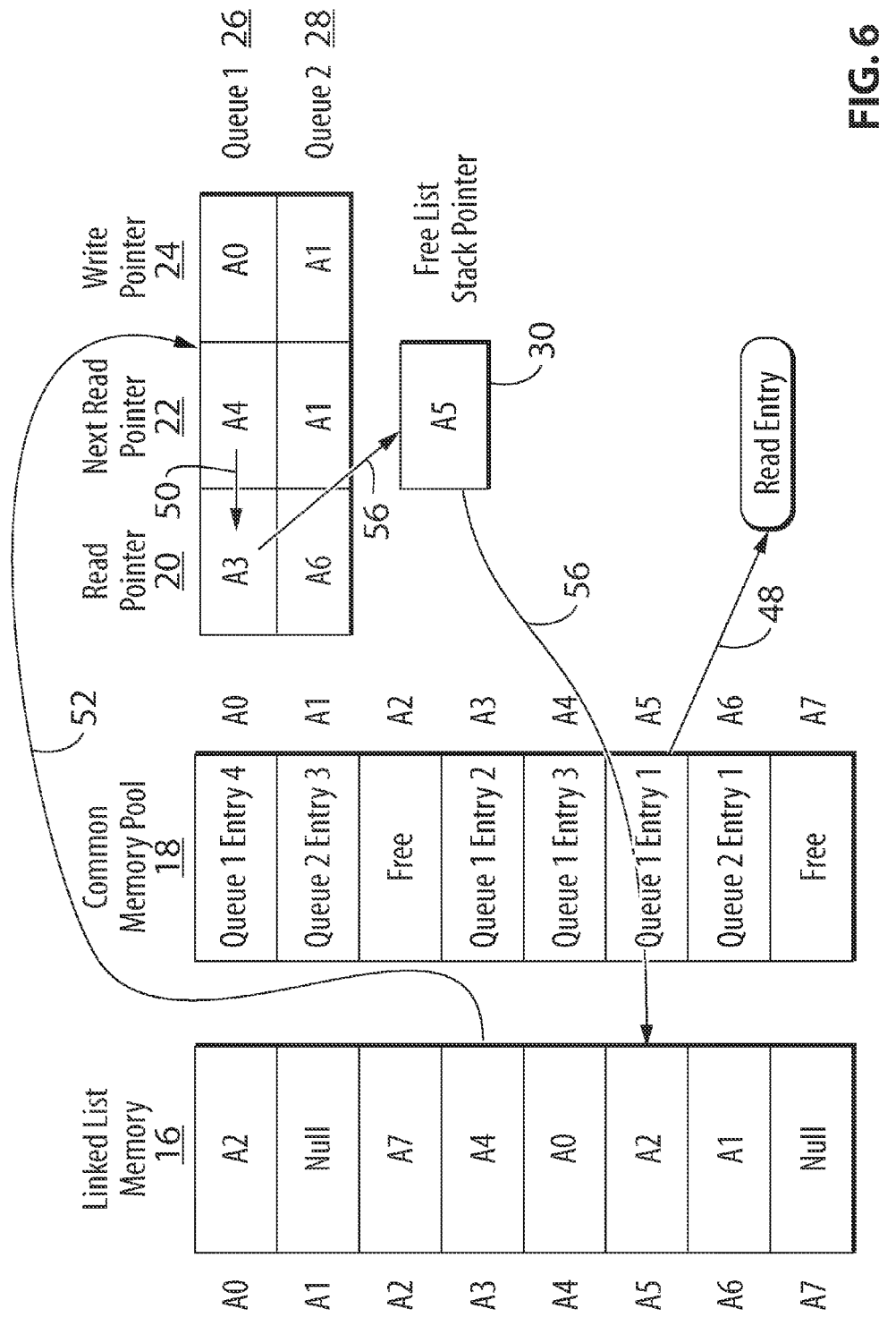
FIG. 6 illustrates a pop operation performed on the system of FIG. 2.
Figure 7:
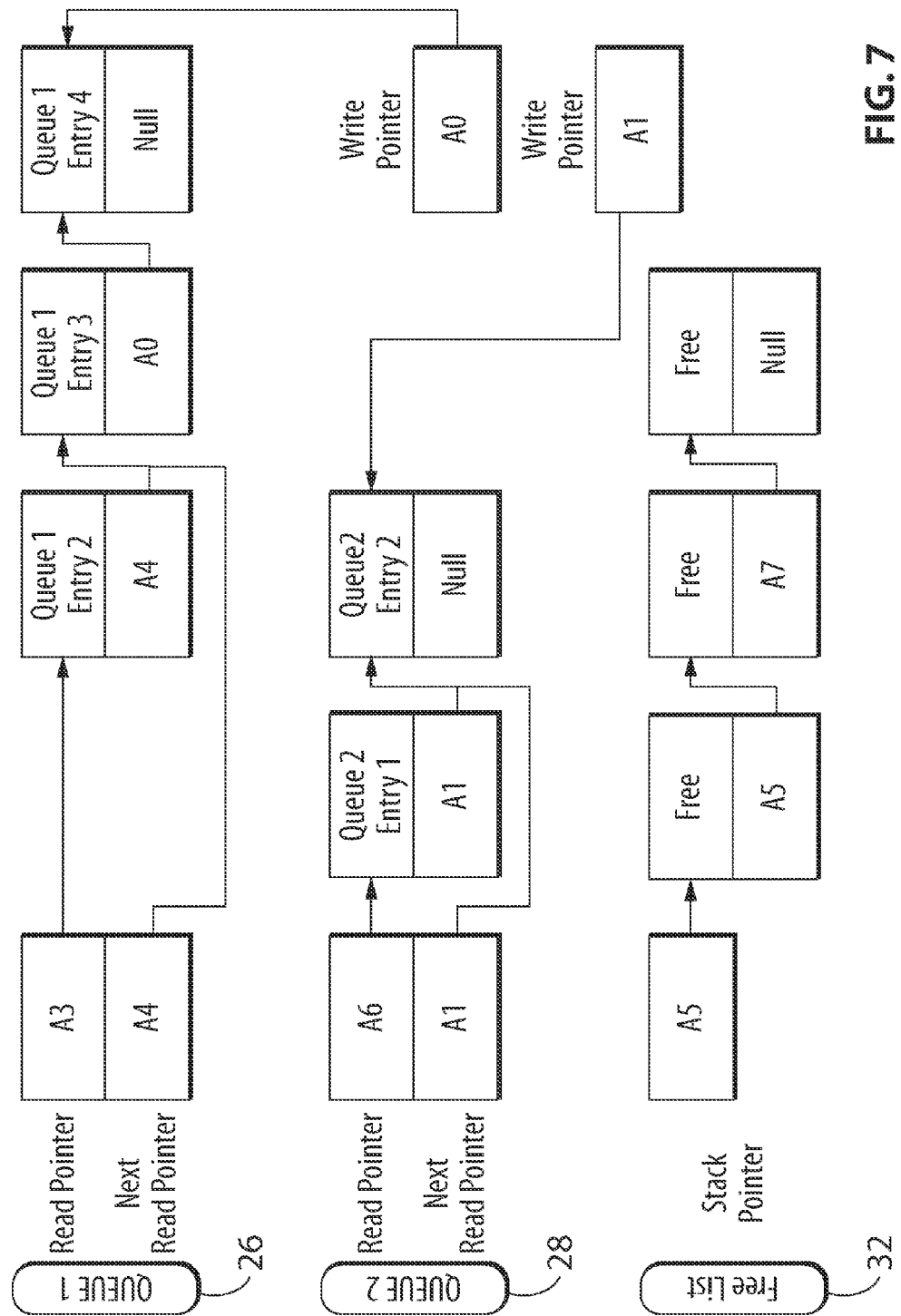
FIG. 7 illustrates a logical view of the pop operation shown in FIG. 6.

Generally, embodiments of the present disclosure provide a method and system for management of linked lists within a dynamic queue system. In a dynamic queue system where a central memory is shared amongst a set of queues, the method organizes the linked list structures of the queues. The linked list pointers of the queues are organized over a set of single port memories. Memory for the queue entries is allocated in an alternating fashion, which allows the method to provide per-cycle access to queues while reducing the footprint of the memory elements used for maintaining the linked list structures. The method disclosed in an embodiment reduces the overall memory requirements for the design and implementation of queue systems with multiple queues sharing a common pool of memory.

One known method to dynamically allocate memory for a queuing system is described in U.S. Pat. No. 6,694,388 Schzukin et al. "Dynamic queue system incorporating multiple queues sharing a single memory". This patent discloses a system whereby linked list structures are used to track free locations within the common pool of memory which are un-allocated and also to track locations within the common pool which are currently occupied and make up the queue data. The '388 patent does not disclose a method to organize the storage of the queue linked list and free linked list; it simply describes the basics of a dynamic queue system.

A hardware implementation of a dynamic queue system is described in U.S. Pat. No. 7,035,988 Marino et al. entitled "Hardware implementation of an N-way dynamic linked list". This patent discloses a hardware implementation whereby locations occupied by queue data are maintain via linked-list and free locations are held in a dedicated FIFO. A buffer RAM is used as the common pool of memory for storing queue data. A next pointer RAM is used to track the next item in queue linked list. A free pointer RAM is used to create a FIFO, storing the locations in the common pool which are unoccupied by queue data. A bank of registers is used to store head and tail pointers for each of the queue linked list. The '988 patent uses a RAM for pointer storage and another RAM of the same size for tracking the available free memory. The method of the '988 patent describes a way organize the storage or the queue linked list and free pointers, but it does not disclose a method to reduce the storage memory requirements for maintenance of these lists.

A method to reduce the processing time for free memory allocation in a linked list memory is described in U.S. Pat. No. 7,111,289 "Method for implementing dual linked list structures to enable fast linked list pointer updates". This patent discloses a linked list structure which maintains a head, tail and head +1 pointer structure. This structure is used to facilitate fewer cycles when allocating memory. A dual free list structure is also described, this allows for memory to be allocated from one list while de-allocated from another. The method described in the '289 patent does not address the organization of a linked list structure over a plurality of single port memories.

Some of the known approaches are represented by the following public domain publications, which are each incorporated by reference in their entirety: U.S. Pat. No. 6,049,802, Waggener et al., 2000, "System and Method for generating a linked list in a computer memory"; U.S. Pat. No. 6,430,666, Roth et al., 2002, "Linked List Memory and method therefor"; U.S. Pat. No. 6,694,388, Schzukin et al., 2004, "Dynamic queue system incorporating multiple queues sharing a single memory"; U.S. Pat. No. 7,111,289, Koob et al., 2006, "Method for implementing dual linked list structures to enable fast linked list pointer updates"; U.S. Pat. No. 7,035,988, Marino et al., 2006, "HW implementation of an N-way dynamic linked list."; US 2005/0235129: "Switch memory management using a linked list."; U.S. Pat. No. 7,334,091: "Queue Memory Management"; U.S. Pat. No. 6,640,267: "Architecture for Multi-Queue Storage Element"; U.S. Pat. No. 6,219,728: "Method and Apparatus for Allocating Shared memory resources among a plurality" of queues each having a threshold value"; U.S. Pat. No. 5,809,557: "Memory array comprised of multiple FIFO devices."

When selecting a storage medium for a dynamic queue system, such as in the case of an application-specific integrated circuit (ASIC)-based implementation, RAM based storage is preferred over register based storage as it is comparatively highly dense. Ideally all storage needs for a dynamic queue system are provided using RAMs versus registers, this includes link-list pointers, queue head and tail pointers, and any other pointers used for maintaining the locations of the unallocated memory.

A single port RAM can perform a read or a write at every clock cycle. A dual port RAM provides one read and one write every clock cycle. During pop operation the linked list memory which maintains the queue linked list and free link list must read and write for each operation. Normally, this would necessitate the use of a dual port RAM, but this is typically 2× the footprint of a single port RAM. By allocating the memory in an alternating fashion over the 2 pools according to embodiments of the present disclosure, a push or pop operation performs a read of one pool and a write of another pool, which permits the use of single port memories since the entries have been organized such that a pool does not require a read and write at same time.

Figure 8:
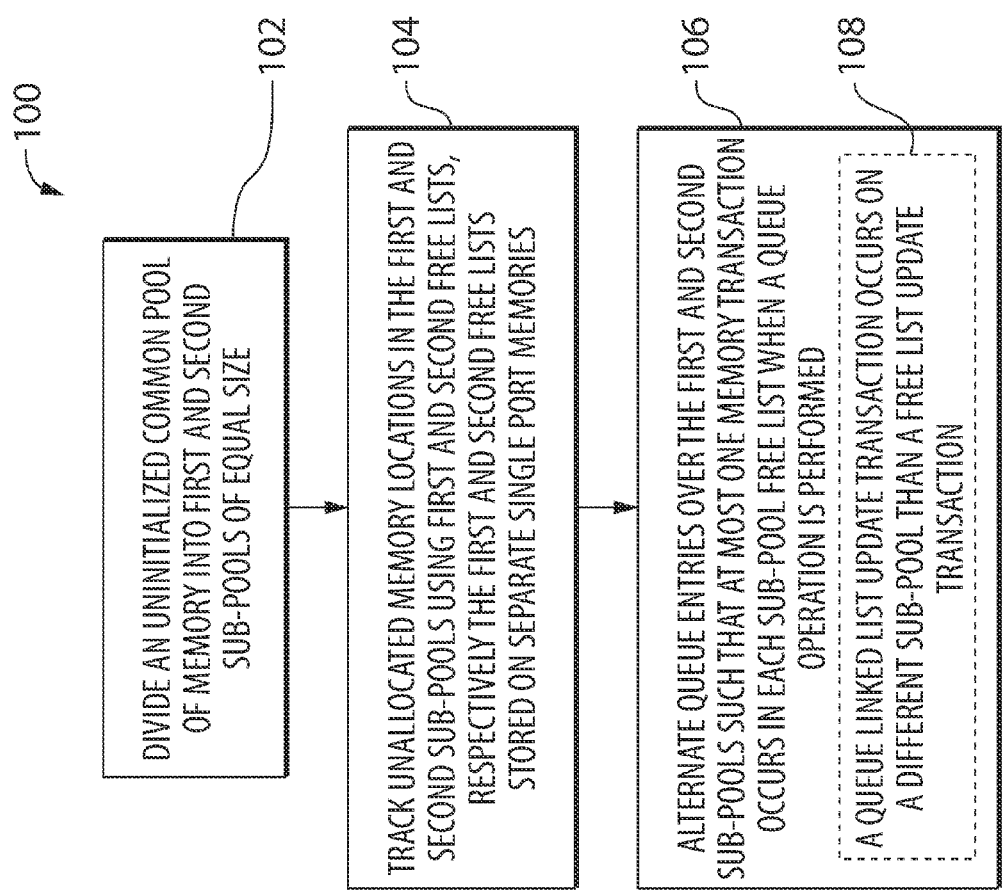
FIG. 8 illustrates a method of linked list management in a dynamic queue system according to an embodiment of the present disclosure.

FIG. 8 illustrates a method of linked list management in a dynamic queue system according to an embodiment of the present disclosure. The method 100 includes the following steps. In step 102, an uninitialized common pool of memory is divided into first and second sub-pools of equal size. In step 104, unallocated memory locations in the first and second sub-pools are tracked using first and second free lists, respectively. The first and second free lists are stored on separate single port memories. In step 106, queue entries are alternated over the first and second sub-pools such that at most one memory transaction occurs in each sub-pool free list when a queue operation is performed, such as a queue push or a queue pop operation. In an example embodiment, in step 108, a queue linked list update transaction occurs on a different sub-pool than a free list update transaction.

A method of linked list management according to an embodiment of the present disclosure begins with an un-initialized memory space whereby the common memory pool is un-allocated neither to the free list nor to any of the linked lists that form a queue. The total available common memory pool is logically divided in step 102 into two separate but equal sub-pools. This division is a logical division and implementation does not require a physical memory for each sub-pool within the common memory. The un-allocated space for each sub-pool is tracked using a linked list called the free list.

The method and apparatus according to embodiments described herein use a novel approach to organize the linked lists by alternating the queue entries over first and second sub-pools of the common memory pool, also referred to as the lower and upper regions of the common memory pool. This allows hardware based implementation to use a set of single port memories, such as single port RAMs, for storage of the linked lists. As shown in the figures, it is worth noting that while two single port memories are being used, each of the two single port memories is half the depth of the common memory pool. Additionally, in an embodiment the method utilizes the same linked list memory for maintaining the free linked list and the queue linked lists. This method maximizes throughput while using fewer memory resources over existing solutions.

Embodiments of the present disclosure provide a method to organize and allocate memory within a dynamic queue system, such that per-cycle queue push/pop operations are achieved using single port RAMs for storage of linked list data. In an embodiment, the common pool of memory is divided into 2 or more sub-pools of equal parts and each un-allocated memory location is tracked via a per sub-pool free list. The sub-pools can all be contained within the one physical memory or multiple physical memories. Each of the sub-pool free lists is maintained as a stack or alternatively a FIFO based linked list.

Entries within a queue are organized such that they are allocated in an alternating fashion through each of the sub-pools. For example, in an embodiment, the first to be pushed onto the queue is allocated from the first sub-pool, while the second entry is allocated from the second sub-pool. This is repeated until the number of queue entries equals the number of sub-pools, after which the next entry will go into the first sub-pool and the pattern is repeated. The method keeps track of which sub-pool is currently scheduled for memory allocation; this is maintained on a per queue basis.

A queue operation, such as a queue push or queue pop operation requires two memory transactions to the linked list memory: one transaction to update the queue linked list and another to update the free list. By alternating the queue entries over the sub-pools, the method ensures that each of the two linked list memory transactions occurs on unique a sub-pool. By having at most one memory transaction for each sub-pool linked list, hardware implementation of dynamic queue system can use single port memories for each sub-pool and provide per-cycle access for queue operations.

When more than two sub-pools are involved, the method of FIG. 8 can be described more generally as a method of linked list management in a dynamic queue system, including the following steps: dividing an uninitialized common pool of memory into a plurality of sub-pools of equal size; tracking unallocated memory locations in each of the plurality of sub-pools using a plurality of free lists each uniquely matched with one of the plurality of sub-pools, each of the plurality of free lists stored on separate single port memories; and alternating queue entries over the plurality of sub-pools such that at most one memory transaction occurs in each sub-pool free list when a queue operation is performed. In an embodiment, when the queue operation is performed, a queue linked list update transaction occurs on a different sub-pool than a free list update transaction. In an embodiment, alternating the queue entries comprises evenly distributing the queue entries over the plurality of sub-pools one at a time, starting with a first sub-pool, until the number of queue entries equals the number of sub-pools, after which the next entry is assigned to the first sub-pool and the pattern is repeated.

FIGS. 9 to 16 illustrate exemplary systems and methods for performing push and pop operations according to embodiments of the present disclosure. These figures do not explicitly include the first step of reading the queue read/write pointers, as this step is not needed when the queue pointers are maintained in registers.

Figure 9:
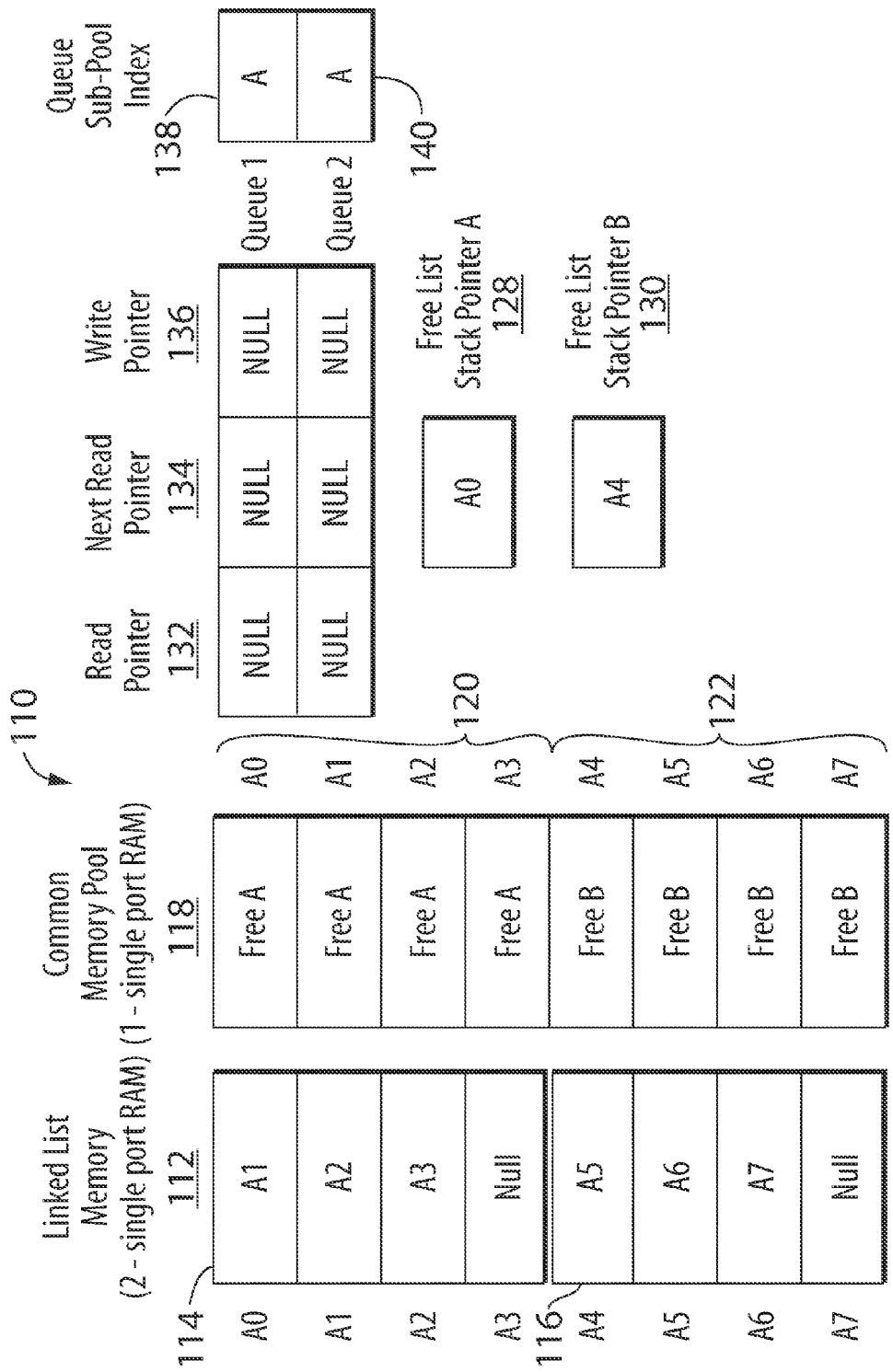
FIG. 9 illustrates a physical view of the state of an initialized dynamic queue system with two queues according to an embodiment of the present disclosure.
Figure 10:
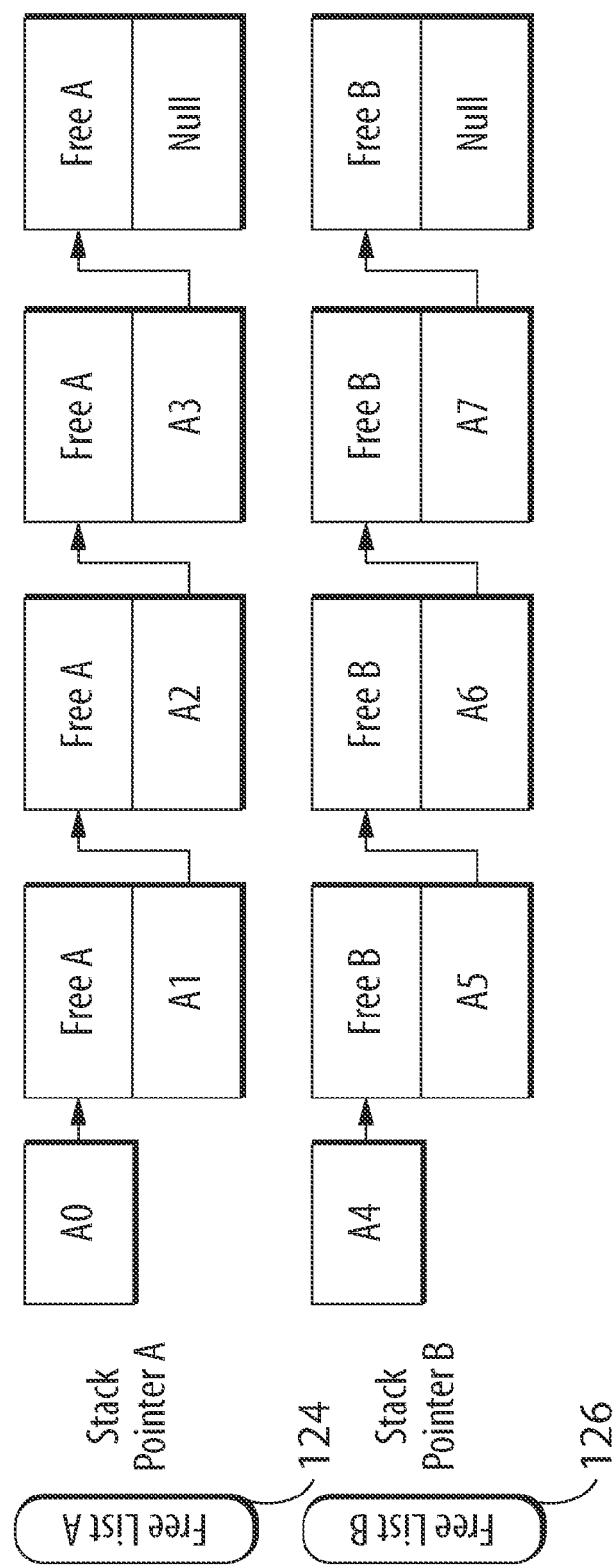
FIG. 10 illustrates a logical view of the embodiment shown in FIG. 9.

FIGS. 9 and 10 show physical and logical views, respectively, of the state of an initialized dynamic queue system 110 with two queues according to an embodiment of the present disclosure. In the physical view of the system 110 in FIG. 9, a linked list memory 112 is a logical reference to two separate single port memories, referred to respectively as a first single port linked list memory 114 and a second single port linked list memory 116, each of which can be implemented as a single port RAM. The common memory pool 118 is a single contiguous memory, implemented in an embodiment in a single port RAM, logically divided into two sub-pools 120 and 122, with each having 4 entries in this embodiment. These entries are part of free list A 124 and free list B 126 shown in FIG. 10. For each sub-pool, the address of the first entry in the free list is stored as a pointer in register. These registers are referred to as the free list stack pointer registers 128 and 130 in FIG. 9.

Each of the free lists 124 and 126 is initialized such that each of the memory locations within a sub-pool is part of a respective free list. The linked list memory 112 is used to store the address to next entry in the free list. In an embodiment, one single port linked list memory is used for each sub-pool. Upon initialization, none of the queue read pointers 132, next read pointers 134, or write pointers 136 are valid. Each queue has an associated sub-pool queue index, shown in FIG. 9 as 138 and 140 for queues 1 and 2, respectively. This index determines the sub-pool that should be used for allocating memory when performing a queue operation, such as a queue pop or a queue push operation. In an embodiment, the first and second free lists are stored on first and second single port linked list memories, respectively, and queue linked lists are stored such that the queue linked lists span both the first and second single port linked list memories.

Initially, all sub-pool queue indexes are equal to one another. In this example, on initialization each sub-pool index 132 and 134 is set to A, meaning that the first forthcoming pop operations will affect sub-pool A free list 124. The NULL values for pointers 132, 134, and 136 are implied by tracking the length of the linked list; the system does not record a NULL value within the linked list memory 112. Similarly, the read and write queue pointers have an implied NULL value when a particular queue contains 0 entries. A separate register is used to track and record the length of each queue linked list and free list.

In an embodiment, the implementation shown in FIGS. 9 and 10 can be described as a dynamic queue system, comprising a common memory pool, first and second sub-pool free lists, and a queue manager. The common memory pool comprises a first sub-pool and a second sub-pool, the first and second sub-pools being of equal size. The first sub-pool free list is provided in a first single port linked list memory and arranged to track each un-allocated memory location in the first sub-pool. The second sub-pool free list is provided in a second single port linked list memory and arranged to track each un-allocated memory location in the second sub-pool. The queue manager is arranged to allocate memory for queue entries in an alternating manner between the first sub-pool and the second sub-pool such that per-cycle queue operations are achieved using the single port linked list memories for storage of linked list data.

Figure 11:
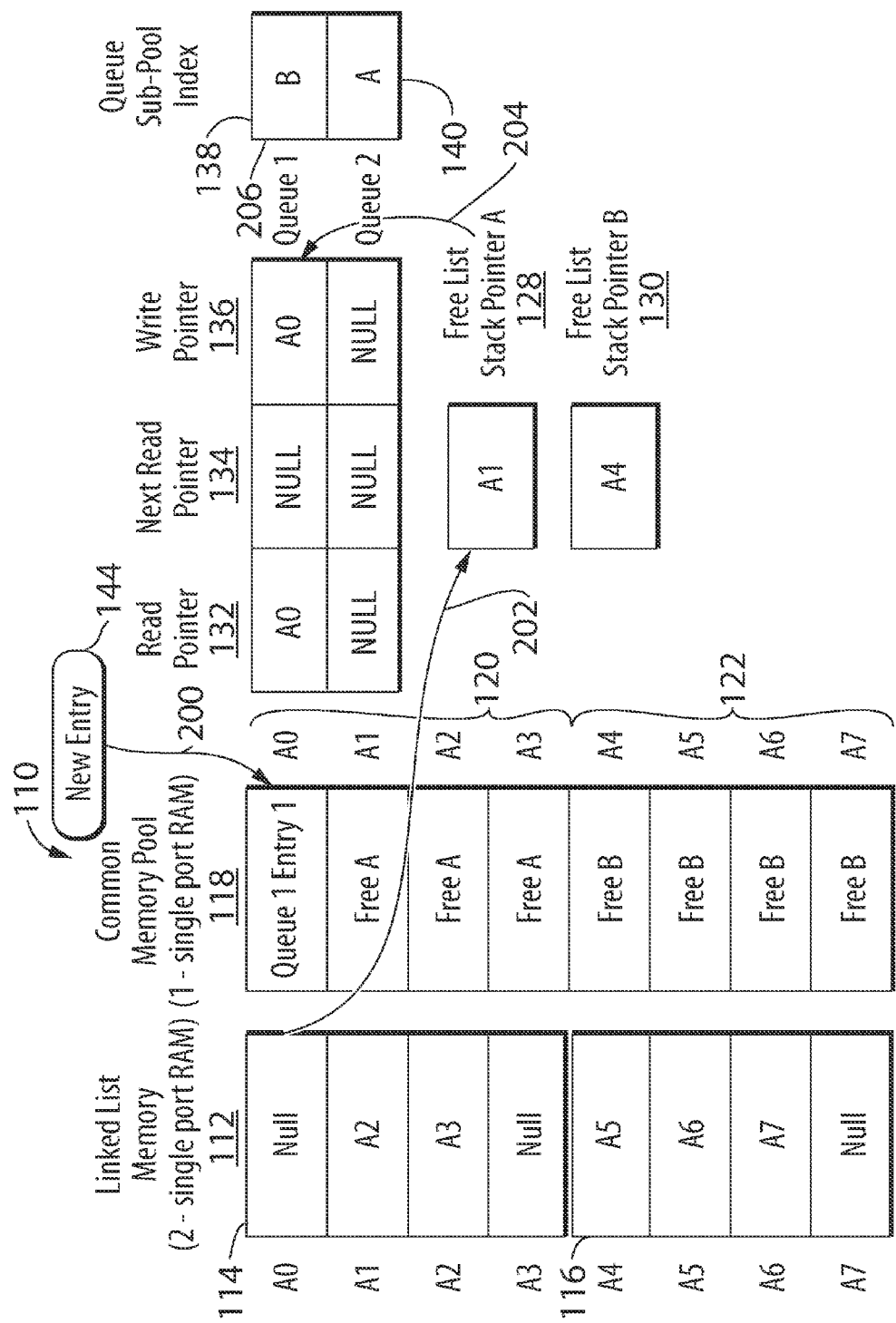
FIG. 11 depicts a first push operation on queue 1 according to an embodiment of the present disclosure.
Figure 12:
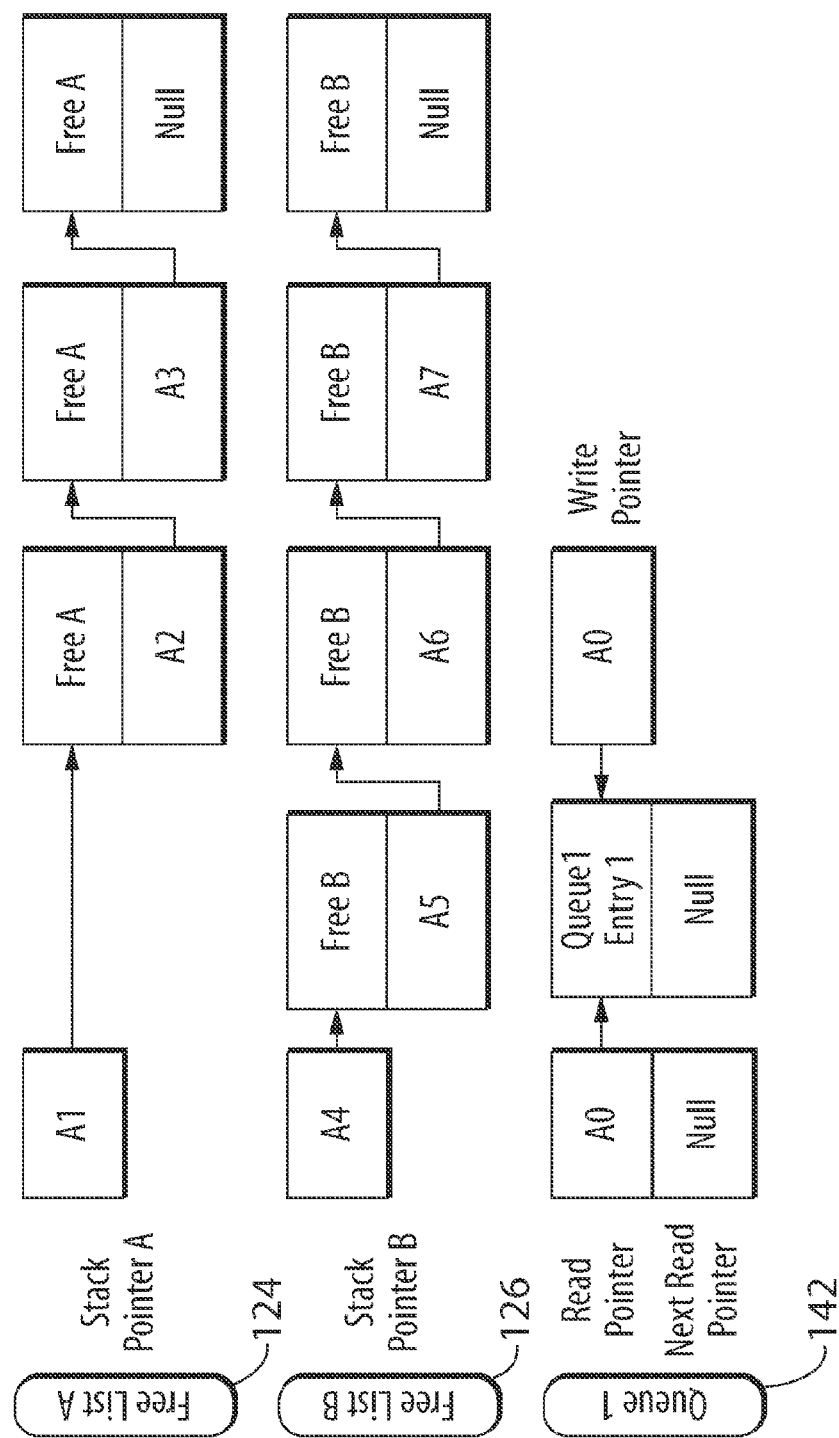
FIG. 12 illustrates a logical view of the embodiment shown in FIG. 11.

FIGS. 11 and 12 show physical and logical views, respectively, of a first push operation on queue 1 142 using a method according to an embodiment of the present disclosure, in which the following actions are illustrated.

Step 200: Write the new queue entry 144 into the common memory pool 118. The queue 1 sub-pool index 138 indicates that the free list A 124 in FIG. 12 is to be used. Therefore the value A0 of the free list stack pointer A 128 is used as the address to the common memory pool 118 where the queue entry is to be written. The write operation is represented in FIG. 11 as the change in value of memory location A0 in sub-pool 120 from FREE A to Queue 1 Entry 1, which in practical implementation would be replaced by an associated value. This is a 1 cycle write operation to the common memory pool. As the stack pointer is stored in a register, the address for common memory is immediately available.

Step 202: Update the free list A 124 in FIG. 12 by removing the newly allocated common memory. This is done by reading the linked list memory 114 associated with sub-pool A 120 to obtain the next item A1 in the free list A 124 and updating the free list stack pointer A 128. This is a 1 cycle read operation of the linked list memory 114, and is also referred to as a linked list update transaction. The stack free list stack pointer A register 128 is then updated on the next cycle.

Step 204: Update the queue write pointer 136 and the queue read pointer 132 for queue 1 with the current contents A0 of the vacant stack pointer A register 128. This is typically a 1 cycle write operation to the queue read/write pointer memory.

Step 206: The sub-pool index 138 for queue 1 is updated to the next sub-pool index B, alternating from the previous value of A. In the case of more than two sub-pools, alternating would comprise assigning the next sub-pool identifier in the list of available sub-pool identifiers.

It is worth noting that certain steps of the overall push operation method are not needed in the embodiment shown in FIGS. 11 and 12, as this is a push of the first entry in the targeted queue. Because it is the first entry, there is no need to update the queue linked list.

Figure 13:
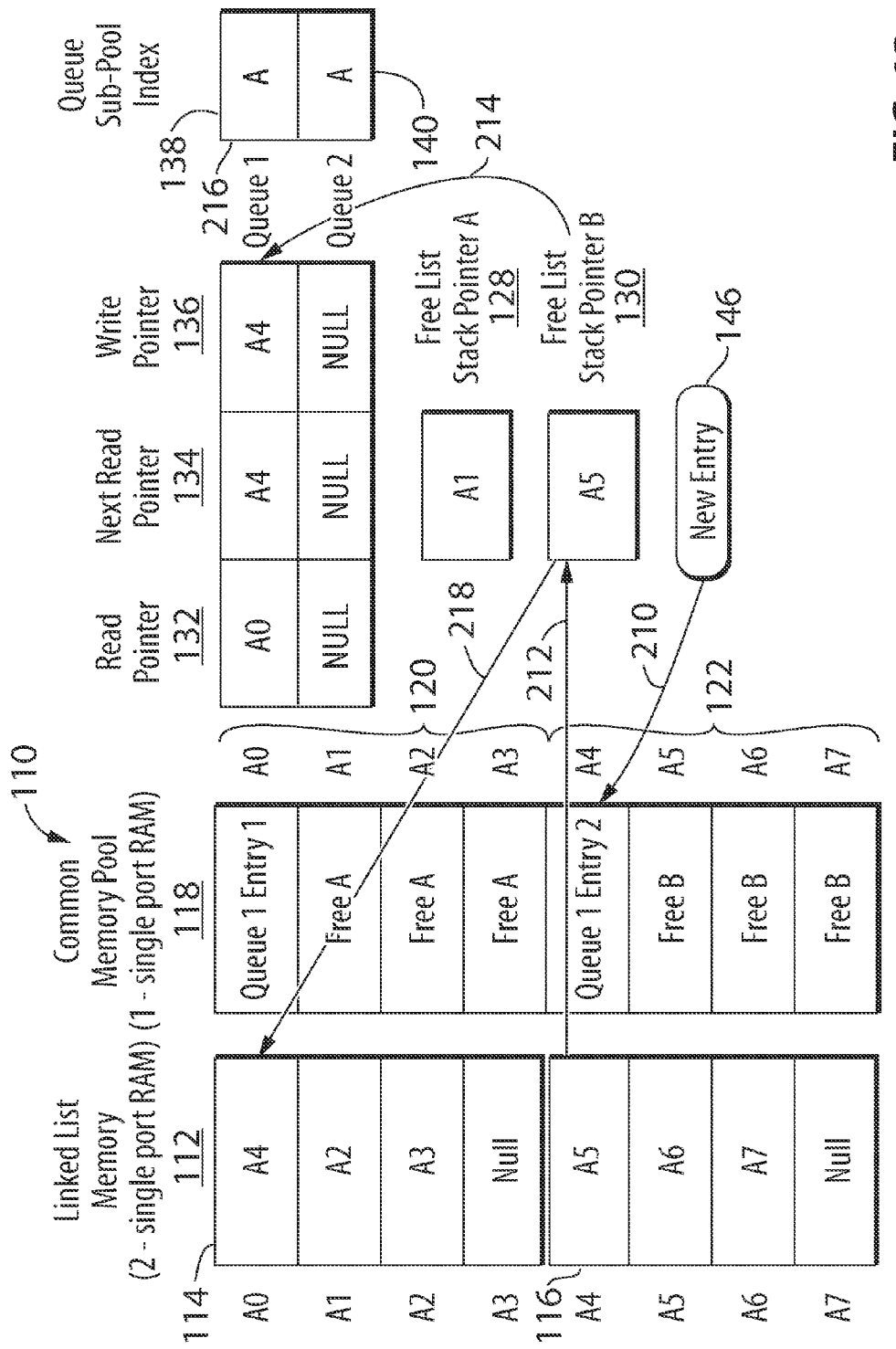
FIG. 13 depicts a second push operation on queue 1 according to an embodiment of the present disclosure.
Figure 14:
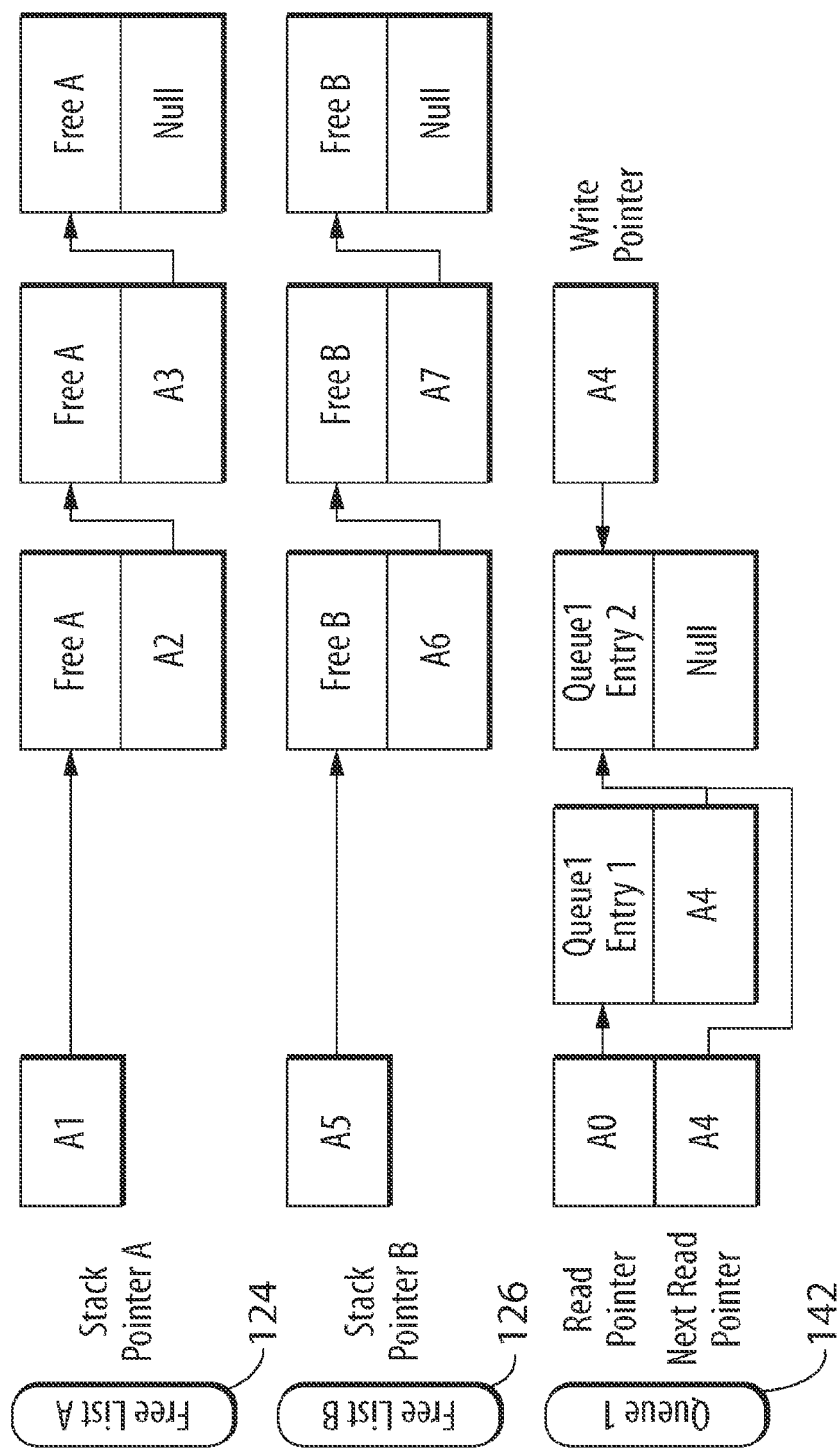
FIG. 14 illustrates a logical view of the embodiment shown in FIG. 13.

FIGS. 13 and 14 show physical and logical views, respectively, of a second push operation on queue 1 using a method according to an embodiment of the present disclosure, in which the following actions are illustrated.

Step 210: Write the new queue entry 146 into the common memory pool 118. The queue 1 sub-pool index 138 indicates that the free list B 126 in FIG. 14 is to be used. Therefore the value A4 of the free list stack pointer B 130 is used as the address to the common memory pool 118 where the queue entry is to be written. This is a 1 cycle write operation to the common memory pool 118. As the stack pointer is stored in a register, the address for common memory is immediately available.

Step 212: Update the queue linked list with the pointer to new entry, updating the Free List Stack Pointer B 128. This takes the last entry currently in the queue and creates a link to the newly pushed data, effectively increasing the linked list by one. This is a 1 cycle write operation to the linked list memory at the address pointed to by the current write pointer, and is referred to as a queue linked list update transaction.

Step 214: Update the queue write pointer 136 for queue 1 with the current contents A4 of the vacant stack pointer B register 130. This effectively moves the write pointer 136 to the latest entry in the queue. This is a 1 cycle write operation to the queue read/write pointer memory.

Step 216: The sub-pool index 138 for queue 1 is updated to the next sub-pool index A.

Step 218: Update the free list B 126 in FIG. 14 by removing the newly allocated common memory. This is done by reading the linked list memory 116 associated with sub-pool B 122 to obtain the next item A5 in the free list B 126 and updating the free list stack pointer B 130. This is a 1 cycle read operation of the linked list memory 116, referred to as a linked list update transaction. The stack free list stack pointer B register 130 is then updated on the next cycle.

It is worth noting that the read and write transactions on the linked list memory 112 are on different sub-pools of the linked list. This is a result of alternating queue entries over the sub-pools according to embodiments of the present disclosure. This ensures that the implementation can use single port memories 114 and 116 for each sub-pool of the linked list memory, providing performance and lower memory area for linked lists compared to known approaches which use a single port memory for the linked lists. Using single port memories for the linked list memory, a queue operation can be performed every clock cycle according to embodiments of the present disclosure, compared to one every two clock cycles with known approaches.

Figure 15:
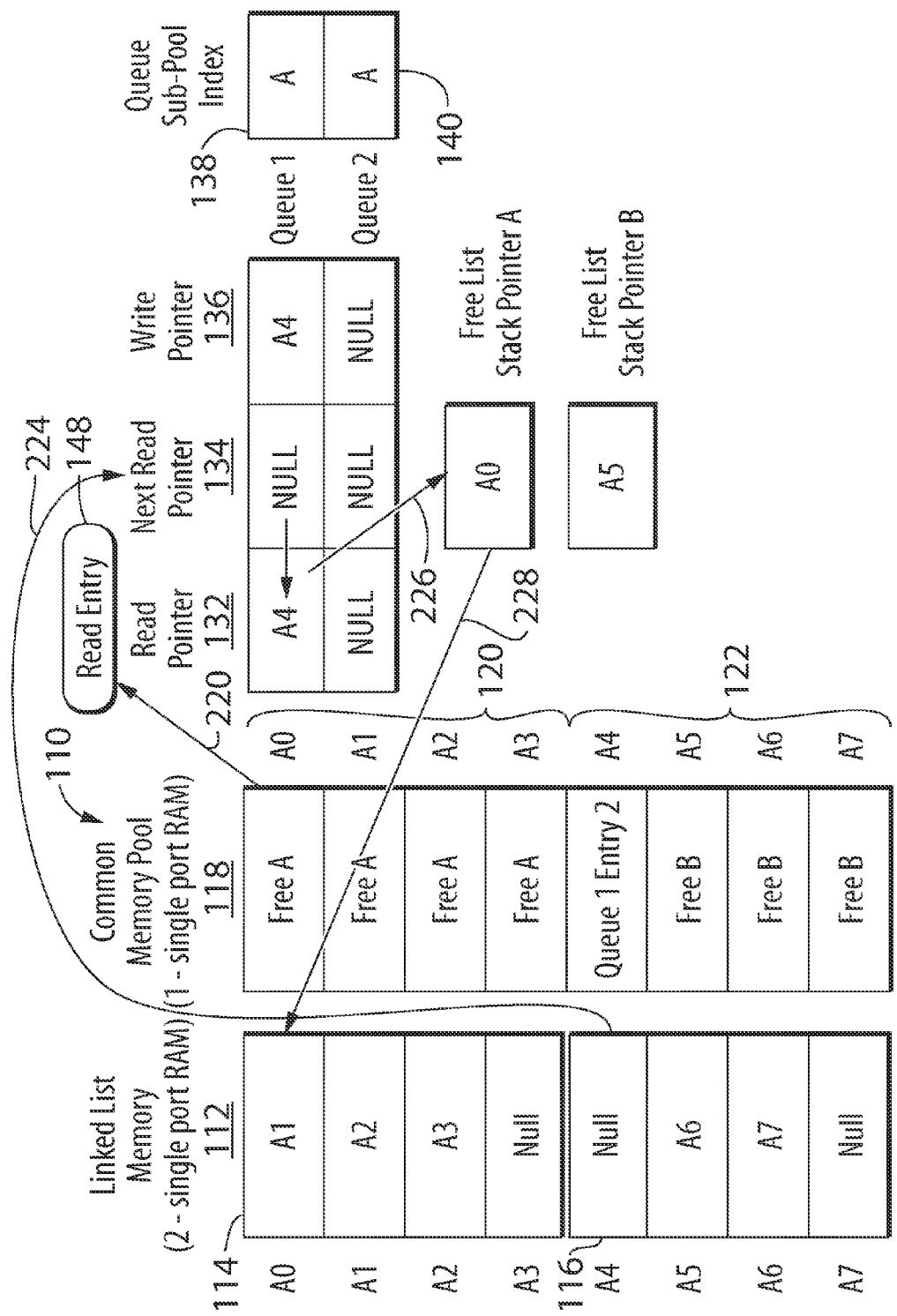
FIG. 15 depicts a pop operation on queue 1 according to an embodiment of the present disclosure.
Figure 16:
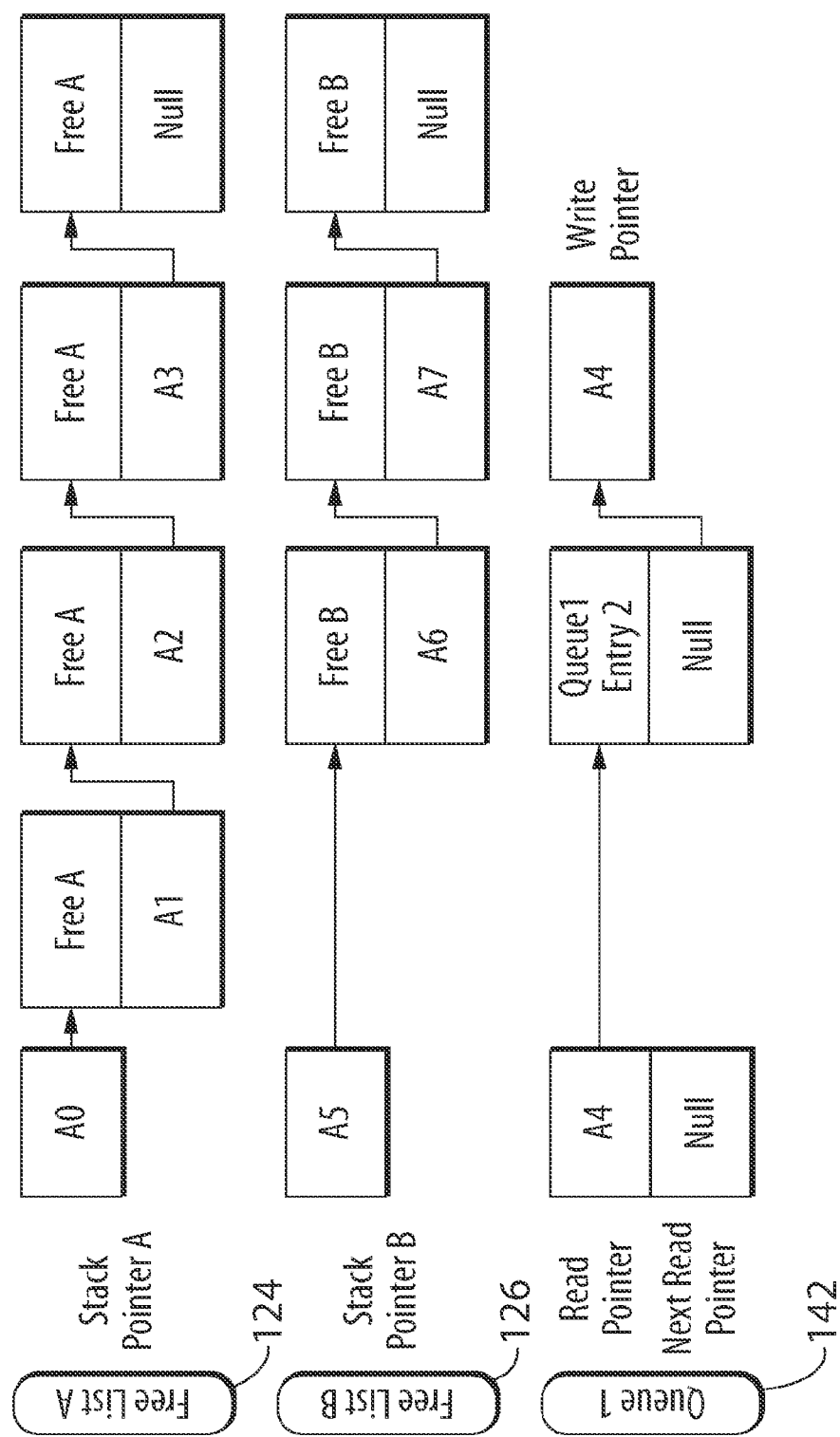
FIG. 16 illustrates a logical view of the embodiment shown in FIG. 15.

FIGS. 15 and 16 show physical and logical views, respectively, of a pop operation on queue 1 using a method according to an embodiment of the present disclosure, in which the following actions are illustrated.

Step 220: Read the queue entry 148, with a value of Queue 1 Entry 1, from the common memory pool 118 using the value A0 of the queue read pointer 132 for queue 1 as the address to the common memory pool 118. This is a 1 cycle read operation of the common memory pool 118.

Step 222: Update the read pointer 132 for queue 1. The value A4 of the next read pointer 134 is written into the current read pointer register 132. This is a 1 cycle write operation into the read pointer register.

Step 224: Update the next read pointer 134. The address A4 of the linked list memory 116 is read to retrieve the address NULL of the entry following the next read pointer. The next read pointer value is used as the address to the linked list memory 112 and the data returned is written into the next read pointer register 134. This is a 1 cycle write operation into the next read pointer register, and a 1 cycle read operation of the linked list memory, or linked list update transaction.

Step 226: Place the newly un-allocated memory A0 at the top of the free list stack pointer A 128. The selection of the free list is based on the common pool address which is being de-allocated. This address effectively identifies the sub-pool. The free list stack pointer 128 is updated with the current read pointer value. This is a 1 cycle write operation into the free list stack pointer register.

Step 228: The linked list value of the newly un-allocated memory is updated to point to the next entry in the free list A 120. The read pointer value A1 is used as the address to the linked list memory 114 and the data written is the current value of free list stack pointer.

Figure 17:
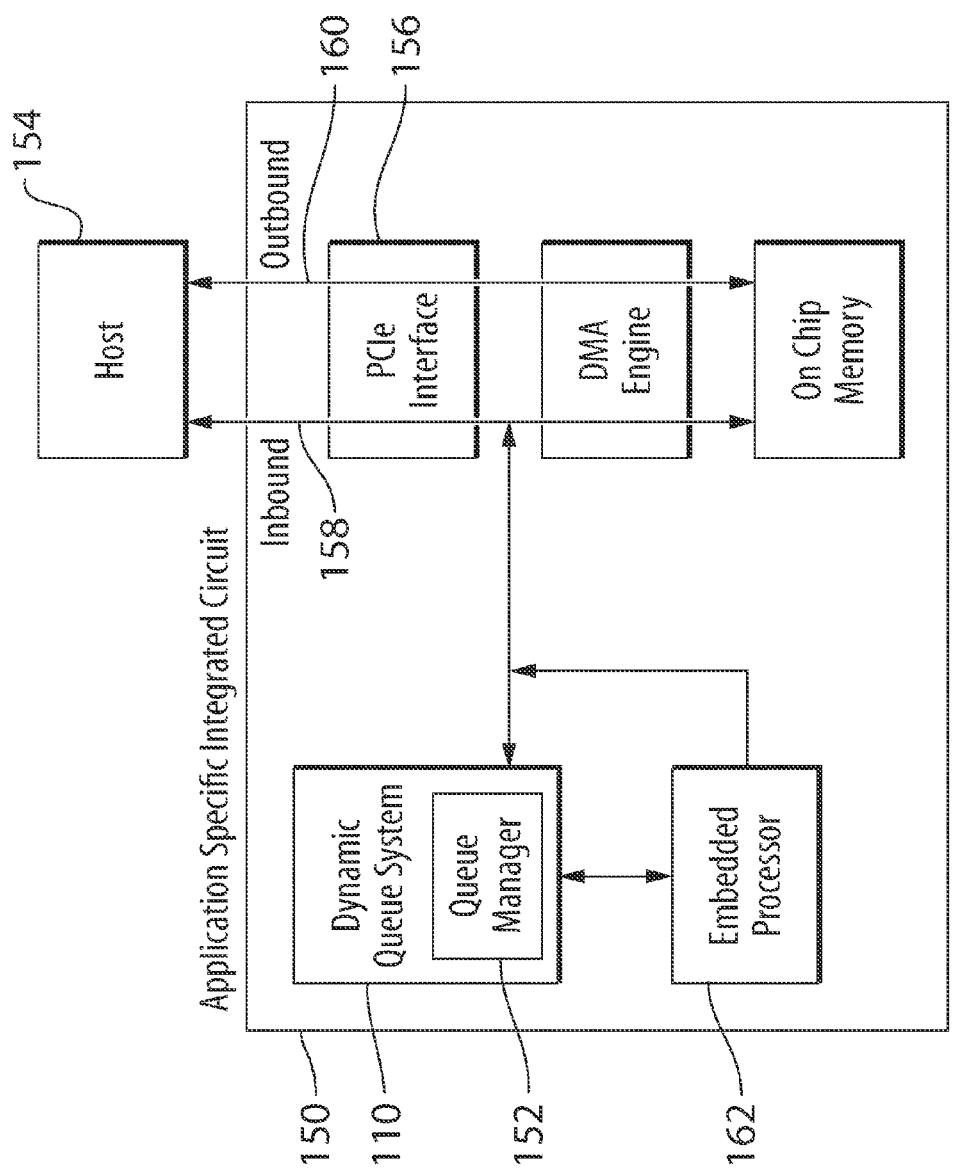
FIG. 17 illustrates an embodiment according to the present disclosure of the method and apparatus for linked list management within a dynamic queue system.

FIG. 17 illustrates an embodiment according to the present disclosure of an apparatus for linked list management with a dynamic queue system. FIG. 17 illustrates an integrated circuit 150, which in an exemplary embodiment is an ASIC, comprising the previously described dynamic queue system 110 and a queue manager 152. The queue manager 152 is arranged to manage or perform the steps 200 to 228 shown in FIGS. 11, 13 and 15 and described above. In an embodiment, the queue manager 152 is provided as a processor or as a controller, which can be dedicated or part of a more general purpose processor or controller.

In applications such as RAID (Redundant Array of Inexpensive Disks) controllers, a Host computer 152 is connected to a RAID ASIC via a PCIe (Peripheral Component Interconnect Express) protocol bus and using a PCIe interface 154. The Host 152 and RAID controller communicate to each other by using a set of queues 156 and 158 on the RAID controller. The queues in the controller are classified as inbound 156, from Host and outbound 158, from RAID controller. The Host writes commands for the RAID controller into the inbound queue 156. The inbound queue 156 is read by the embedded processor 160 and commands are processed. After completing the Host command, the embedded processor 160 will signal the Host that the command is complete by writing into the outbound queue 158. A write to the outbound queue will also generate an interrupt to the Host.

With the advent of the PCIe SR-IOV (single root input/output virtualization) standard, RAID controllers are beginning to support virtualization. Virtualization causes the RAID controller to present multiple virtual functions to the Host and consequently multiple inbound and outbound queues. Since the memory space within the ASIC is limited, it is best to keep the memory of the inbound and outbound queues flexible such that they can be use for any function. In this environment, a method according to an embodiment of the present disclosure is used to provide per-cycle access to queues for push and pop operations and reduce the area of the linked list memory.

When the common memory pool is divided into more than two sub-pools, in an embodiment the present disclosure provides a dynamic queue system including a common memory pool, a plurality of sub-pool free lists, and a queue manager. The common memory pool comprises a plurality of sub-pools, each of the plurality of sub-pools being of equal size. Each of the plurality of sub-pool free lists is provided in a separate single port linked list memory. Each of the plurality of sub-pool free lists are uniquely associated with one of the plurality of sub-pools and arranged to track each un-allocated memory location in the uniquely associated sub-pool. The queue manager is arranged to allocate memory for queue entries in an alternating manner over the plurality of sub-pools such that per-cycle queue operations are achieved using the single port linked list memories for storage of linked list data.

Embodiments described herein are applicable to any queuing system, hardware or software based, which uses linked lists to form queues and manage memory. The queues can be FIFO (first-in-first-out), LIFO (last-in-first-out) or combinations thereof. The method can be used to provide per-cycle access within these systems, or to improve the performance of more complex queuing systems in which per-cycle access is not possible.

By using the method of embodiments described herein, hardware implementations of a dynamic queue system realize a substantial decrease in the memory footprint without compromising on performance. The method of embodiments described herein is particularly useful in FPGA (Field Programmable Gate Array) based implementations as memory resources are limited. Reducing the amount of area for embedded memories also has an economic impact in the development of ASICs, as it directly effects the cost of manufacturing, packaging, test and production. Because queuing is a fundamental data structure for computing, the method of embodiments described herein and its implementation are applicable to a wide range of products. Specifically the use of dynamic queuing is prevalent in a variety of products within the storage and communications domain, such products include an SOC (System on a Chip) for RAID.

In the preceding description, for purposes of explanation, numerous details are set forth in order to provide a thorough understanding of the embodiments. However, it will be apparent to one skilled in the art that these specific details are not required in order to practice the embodiments. In other instances, well-known electrical structures and circuits are shown in block diagram form in order not to obscure the embodiments. For example, specific details are not provided as to whether the embodiments described herein are implemented as a software routine, hardware circuit, firmware, or a combination thereof.

Embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope of the embodiments and the disclosure, which is defined solely by the claims appended hereto.

What is claimed is:

1. A method of linked list management in a dynamic queue system, comprising:
   logically dividing an uninitialized common memory pool into first and second sub-pools of equal size, each sub-pool configured to store a queue entry and perform a queue operation on the queue entry;
   tracking unallocated memory locations in the first and second sub-pools using first and second free lists, respectively, the first and second free lists stored on separate first and second single port memories; and
   alternating storing the queue entries in the first and second sub-pools, such that performing a queue operation on the queue entry in either the first or second sub-pool comprises accessing the first free list and the second free list in one clock cycle by performing, in the one clock cycle, both a first memory transaction at the first single port memory and a second memory transaction at the second single port memory, wherein each of the queue operation, the first memory transaction, and the second memory transaction comprises a read or a write operation.

2. The method of claim 1 wherein, when the queue operation is performed, a queue linked list update transaction occurs on a different sub-pool than a free list update transaction.

3. The method of claim 1 further comprising: initializing the first and second free lists such that each of the memory locations within a sub-pool is part of a respective free list.

4. The method of claim 1 further comprising storing, for each queue, an associated sub-pool queue index, which determines the sub-pool to be used for allocating memory when performing a queue operation.

5. The method of claim 1 further comprising storing the first and second free lists on first and second single port linked list memories, respectively, and storing queue linked lists such that the queue linked lists span both the first and second single port linked list memories.

6. The method of claim 1 further comprising:
   tracking allocated memory locations occupied by queue entries in the first and second sub-pools by using queue linked lists, the queue linked lists being stored on the same single port memories as the first and second free lists.

7. A dynamic queue system, comprising:
   an uninitialized common memory pool circuit comprising a first sub-pool and a second sub-pool, the first and second sub-pools being of equal size and being logical divisions of the common memory pool and each sub-pool configured to store a queue entry and perform a queue operation on the queue entry;
   a first sub-pool free list provided in a first single port linked list memory and arranged to track each un-allocated memory location in the first sub-pool;
   a second sub-pool free list provided in a second single port linked list memory and arranged to track each un-allocated memory location in the second sub-pool; and
   a queue manager arranged to allocate memory for queue entries in an alternating manner between the first sub-pool and the second sub-pool such that performing a queue operation on the queue entry in either the first or second sub-pool comprises accessing the first free list and the second free list in one clock cycle by performing, in the one clock cycle, both a first memory transaction at the first single port linked list memory and a second memory transaction at the second single port linked list memory, wherein each of the queue operation, the first memory transaction, and the second memory transaction comprises a read or a write operation.

8. The system of claim 7 wherein the queue manager allocates memory for queue entries such that at most one memory transaction occurs in each sub-pool free list when a queue operation is performed.

9. The system of claim 7 wherein the queue manager allocates memory for queue entries such that a queue linked list update transaction occurs on a different sub-pool than a free list update transaction.

10. The system of claim 7 further comprising a queue sub-pool index associated with each queue, which determines the sub-pool to be used for allocating memory when performing a queue operation.

11. The system of claim 7 wherein the first and second single port linked list memories each comprise a single port random access memory (RAM).

12. The system of claim 7 wherein the first and second sub-pool free lists are maintained as a stack.

13. The system of claim 7 wherein the first and second sub-pool free lists are maintained as a first in first out (FIFO) based linked list.

14. The system of claim 7 further comprising:
   first and second queue linked lists provided on the same single port memories as the first and second free lists, respectively, and arranged to track allocated memory locations occupied by queue entries in the first and second sub-pools, respectively.

15. A method of linked list management in a dynamic queue system, comprising:
   logically dividing an uninitialized common pool of memory into a plurality of sub-pools of equal size, each sub-pool configured to store a queue entry and perform a queue operation on the queue entry;
   tracking unallocated memory locations in the plurality of sub-pools using a plurality of free lists each uniquely matched with one of the plurality of sub-pools, each of the plurality of free lists stored on separate single port memories;

alternating storing the queue entries in the plurality of sub-pools such that performing a queue operation on the queue entry in any of the sub-pools comprises accessing two of the free lists in one clock cycle by performing, in the one clock cycle, both a first memory transaction at a first single port memory and a second memory transaction at a second single port memory, wherein each of the queue operation, the first memory transaction, and the second memory transaction comprises a read or a write operation.

16. The method of claim 15 wherein, when the queue operation is performed, a queue linked list update transaction occurs on a different sub-pool than a free list update transaction.

17. The method of claim 15 wherein alternating the queue entries comprises evenly distributing the queue entries over the plurality of sub-pools one at a time, starting with a first sub-pool, until a number of queue entries equals a number of sub-pools.

18. The method of claim 17 further comprising, after the number of queue entries equals the number of sub-pools, assigning the next entry to the first sub-pool and repeating the pattern.

19. The method of claim 15 further comprising:
tracking allocated memory locations occupied by queue entries in the plurality of sub-pools by using queue linked lists, the queue linked lists being stored on the same single port memories as the plurality of free lists.

20. A dynamic queue system, comprising:
an uninitialized common memory pool circuit comprising a plurality of sub-pools, each of the plurality of sub-pools being of equal size and being logical divisions of the common memory pool and each sub-pool configured to store a queue entry and perform a queue operation on the queue entry;
a plurality of sub-pool free lists each provided in a separate single port linked list memory, each of the plurality of sub-pool free lists being uniquely associated with one of the plurality of sub-pools and arranged to track each un-allocated memory location in the uniquely associated sub-pool;
a queue manager arranged to allocate memory for queue entries in an alternating manner over the plurality of sub-pools such that performing a queue operation on the queue entry in any of the sub-pools comprises accessing two of the free lists in one clock cycle by performing, in the one clock cycle, both a first memory transaction at a first single port linked list memory and a second memory transaction at a second single port linked list memory, wherein each of the queue operation, the first memory transaction, and the second memory transaction comprises a read or a write operation.

21. The system of claim 20 wherein the queue manager allocates memory for queue entries such that at most one memory transaction occurs in each sub-pool free list when a queue operation is performed.

22. The system of claim 20 wherein the queue manager allocates memory for queue entries such that a queue linked list update transaction occurs on a different sub-pool than a free list update transaction.

23. The system of claim 20 wherein the queue manager evenly distributes the queue entries over the plurality of sub-pools one at a time, starting with a first sub-pool, until the number of queue entries equals the number of sub-pools.

24. The system of claim 20 further comprising:
a plurality of queue linked lists provided on the same single port memories as the plurality of free lists and arranged to track allocated memory locations occupied by queue entries in the plurality of sub-pools.

* * * * *